US011219225B2

(12) United States Patent
Ur-Rehman et al.

(10) Patent No.: US 11,219,225 B2
(45) Date of Patent: Jan. 11, 2022

(54) METHODS FOR CASEIN PRODUCTION

(75) Inventors: Shakeel Ur-Rehman, Meridian, ID (US); John M. Dunker, Colorado Springs, CO (US)

(73) Assignee: Select Milk Producers, Inc., Artesia, NM (US)

( * ) Notice: Subject to any disclaimer, the term of this patent is extended or adjusted under 35 U.S.C. 154(b) by 0 days.

(21) Appl. No.: 12/741,034

(22) PCT Filed: Nov. 2, 2008

(86) PCT No.: PCT/US2008/082175
§ 371 (c)(1),
(2), (4) Date: Aug. 13, 2010

(87) PCT Pub. No.: WO2009/059266
PCT Pub. Date: May 7, 2009

(65) Prior Publication Data
US 2010/0303958 A1    Dec. 2, 2010

Related U.S. Application Data

(60) Provisional application No. 60/985,135, filed on Nov. 2, 2007.

(51) Int. Cl.
| A23C 9/142 | (2006.01) |
| A23C 19/05 | (2006.01) |
| A23J 1/20 | (2006.01) |
| A23J 3/10 | (2006.01) |

(52) U.S. Cl.
CPC ............ *A23C 9/1422* (2013.01); *A23C 19/05* (2013.01); *A23J 1/20* (2013.01); *A23J 3/10* (2013.01); *A23C 2210/202* (2013.01); *A23V 2002/00* (2013.01)

(58) Field of Classification Search
CPC .......... A23C 2210/20; A23C 2210/202; A23C 21/06; C07K 1/34; A01J 11/06
USPC .......................................................... 426/39
See application file for complete search history.

(56) References Cited

U.S. PATENT DOCUMENTS

| 5,169,666 | A | * | 12/1992 | Woychik ....................... 426/580 |
| 5,503,864 | A | * | 4/1996 | Uchida ................. A23C 9/1425 |
|           |   |   |         | 426/583 |
| 6,326,044 | B1 | * | 12/2001 | Lindquist ............. A23C 9/1422 |
|           |    |   |         | 210/650 |
| 6,485,762 | B1 | * | 11/2002 | Rizvi et al. ...................... 426/34 |
| 2003/0077357 | A1 | * | 4/2003 | Rizvi ................... A23C 9/1422 |
|              |    |   |         | 426/34 |
| 2007/0104847 | A1 | * | 5/2007 | O'Mahony et al. .......... 426/582 |

OTHER PUBLICATIONS

Rosenberg, M., "Current and future applications for membrane processes in the dairy industry," Trends in Food Science & Technology, Jan. 1995, vol. 6, 12-19.*
Samuelsson, G., Dejmek, P., Tragardh, G., and Paulsson, M., "Minimizing Whey Protein Retention in Cross-flow Microfiltration of Skim Milk," Int. Dairy Journal, 7:237-242 (1997).*
Mulvihill, D. M. and Fox, P. F., "Developments in the production of milk proteins," New and Developing Sources of Food Proteins, (B. J. F. Hudson, ed., Chapman & Hall, 1994).*

* cited by examiner

*Primary Examiner* — Jeffrey P Mornhinweg
(74) *Attorney, Agent, or Firm* — Winstead PC

(57) ABSTRACT

Embodiments of the invention are directed to a process involving microfiltration of milk, providing a product that is useful as a source of casein and another product that is useful as a source of whey protein. Another embodiment of the invention is directed to preparing milk products like casein, dairy beverages, milk protein concentrates and cheese from microfiltration retentate.

2 Claims, No Drawings

METHODS FOR CASEIN PRODUCTION

CROSS REFERENCES TO RELATED APPLICATIONS

This application claims the benefit of U.S. Provisional Application 60/985,135, filed Nov. 2, 2007.

TECHNICAL FIELD

An embodiment of the invention is directed to a process involving microfiltration of milk, providing a product that is useful as a source of casein and another product that is useful as a source of whey protein. Another embodiment of the invention is directed to preparing milk products like casein, dairy beverages, milk protein concentrates and cheese from microfiltration retentate. A further embodiment of the invention is directed to compositions obtained from skim milk that are useful as a source of whey protein. An embodiment of the invention provides for the use of polymeric membranes in the microfiltration step.

BACKGROUND OF THE INVENTION

In a conventional cheese making process, dilute whey byproduct obtained after coagulation may be subjected to ultrafiltration to concentrate whey proteins (also known and referred to as serum proteins) to produce whey protein concentrate or whey protein isolate. This produces highly variable whey protein products in terms of composition and functionality, leading food manufacturers to use other protein sources. In the traditional cheesemaking process, the properties of the whey proteins are also altered.

The prior art processes are directed to a process for the preparation of a precipitate of casein and whey protein from milk, involving a heating step to denature the whey protein, followed by cooling and acidification to precipitate out the casein. The acidification step alters the native state of the recovered proteins.

SUMMARY OF THE INVENTION

It was a goal of the research leading to the invention herein to provide an economically viable process for obtaining casein from skim milk, while also obtaining a large percentage of the whey protein from the skim milk in a native state. This goal has been accomplished herein by subjecting skim milk to microfiltration to provide a retentate having a protein yield which is rich in casein whereby the retentate is useful for manufacture of casein, caseinate, milk protein concentrate or cheese making, as well as other applications such as infant formula, parenteral foods, nutritional products and medical foods suitable for use by gastric bypass patients. The casein present in the MF retentate is micellar casein as the micellar integrity of caseins is not lost during MF process. Additionally, a permeate is produced which is a good source of native or virgin whey proteins having very high nutritional content. In contrast, in the traditional casein manufacturing process, the natural micellar stability of caseins is lost due to acidification in the acid caseins or due to renneting (addition of proteolytic enzyme) in the rennet caseins.

In one aspect, the invention herein is directed at a process for obtaining from skim milk a concentrated milk product rich in casein and another product which is a source of whey protein, said process comprising subjecting skim milk to microfiltration to provide a retentate which is the concentrated milk product rich in casein and a permeate which is the product that is the source of whey protein.

Typically, the microfiltration is carried out at a temperature of 5°-55° C. and pH of 6.0 to 6.8, at a concentration factor of 3-fold to 6-fold for a period of time ranging from 1-18 hours.

The microfiltration retentate (MF retentate) is depleted in whey protein and contains higher weight percentage of casein (70-75%) compared to the 30% of total solids in the skim milk being processed. The microfiltration permeate (MF permeate) contains 90-98% of the whey protein of the skim milk being processed and typically no or little casein. Preferably, the microfiltration is carried out using a membrane of 20,000-200,000 daltons pore size at a pressure of 10-40 psi. Very preferably, the microfiltration is carried out to provide a retentate which is concentrated to a concentration factor of 5-6 fold relative to the skim milk being processed and pH is maintained at the same pH as the starting milk material, i.e., 6.5 to 6.8.

An embodiment of the invention provides a microfiltration process using a membrane with a molecular weight cut off of 200,000 daltons and maximum operating pressures of 20 psi.

An alternate embodiment of the invention is directed to a process for making cheese, comprising the steps of: (a) preparing an admixture of retentate as described above and milkfat to obtain a protein:fat ratio within 15% of that in the final cheese; (b) forming a homogeneous cheesemilk from the admixture; (c) adding acidulant and/or starter culture to achieve suitable and typical acidity in the final cheese being made; (d) adding rennet to cause formation of a coagulum; (e) cutting the coagulum and heating and draining whey if drainable whey is present to produce cheese curd of 44 to 56% moisture content; and (f) forming the cheese curd into the final cheese. The resulting whey contains little or no whey proteins compared with traditional cheese whey.

As used herein, the term "microfiltration" is used to mean a class of filtration that typically uses membrane pore sizes ranging from 0.05 to 0.2 µm and pressures on the upstream side of the membrane ranging from 10-40 psi.

As used herein, the term "retentate" is used to mean in relation to a microfiltration process that liquid product of skim milk microfiltration that is the concentrated skim milk feed and which contains all the components typically found in skim milk but with an increased solids mass percentage (as compared to the original skim milk) of casein, fat, and minerals (ash), primarily being calcium, phosphorus, and magnesium.

As used herein, the term "permeate" is used to mean in relation to a microfiltration process that liquid product of skim milk microfiltration which contains only those skim milk components that are able to pass through the microfiltration membrane. Permeate from microfiltration of skim milk is typically composed of water, lactose, whey proteins, and minerals (ash), primarily being calcium, phosphorus, magnesium, sodium and potassium.

As used herein, the term "concentration factor" is used to mean a reduction in volume from the original volume of skim milk to a specific volume, and is calculated by dividing the original volume of milk used in microfiltration by the volume of the retentate.

DETAILED DESCRIPTION OF ILLUSTRATIVE EMBODIMENTS

An embodiment of the invention is directed at a process for obtaining from skim milk a concentrated milk product and another product which is a source of whey protein, said process comprising subjecting skim milk to microfiltration to provide a retentate which is the concentrated milk product and a permeate which is the product that is the source of whey protein, where typically the microfiltration is carried out to provide a retentate which is concentrated to a concentration factor of 3-6 fold as compared to the skim milk being processed and is depleted in whey protein and contains higher weight percentage of casein compared to the skim milk being processed and to provide a permeate which contains 90-98% of the whey protein of the skim milk being processed and no or little casein.

Skim milk microfiltration is a protein selective process that normally retains all of the casein in the retentate and passes a major portion of the whey protein into the permeate.

The microfiltration is preferably carried out utilizing a uniform transmembrane pressure loop with retentate circulating in the loop containing a microfiltration membrane and the permeate passing through a microfiltration membrane leaving as one product stream and the retentate being obtained as the other product once all the permeate is recovered.

The microfiltration membrane pore size can range, for example, from 0.05 to 0.2 µm and preferably ranges from 0.1 µm to 0.2 µm and very preferably is 0.2 µm.

The uniform transmembrane pressure can range, for example, from 10-40 psi.

The feed to the system is skim milk and preferably is high temperature, short time pasteurized skim milk which for pasteurization has been heated to about 73° C. for at least 15 seconds, to about 72° C. for at least 16 seconds, or any other similar time and temperature combination.

The system is preferably maintained at 5° C.-15° C., to maintain optimum flow, but without significant and detrimental heat-induced reactions between caseins and whey proteins. A preferred temperature range for the operation of the system is between 10° C.-15° C.

As indicated above, the microfiltration is carried out to provide a retentate which is concentrated to a concentration factor (CF) of 3-6 fold as compared to the skim milk being processed. As indicated above, this means that the retentate is reduced in volume from the original volume (OV) of the skim milk to a volume of (1/CF) (OV), so there is a volume reduction ranging from about 67% (3-fold) to about 84% (6-fold).

In an embodiment of the invention, the MF retentate contains a higher solids mass percentage of casein and is depleted in whey protein as compared to the original skim milk and may be described as being casein-rich.

The retentate product is readily processed into cheese by admixing milkfat (e.g., butteroil or cream including plastic, i.e., high fat content, cream) to approximate the protein:fat ratio desired in the cheese being made, forming a homogeneous cheesemilk, adding acidulant (e.g., glucono-delta-lactone) and/or starter culture to achieve suitable acidity in the final cheese, adding rennet to cause formulation of a coagulum, cutting the curd, heating and draining drainable whey and then forming the final cheese.

The same retentate is useful to produce a variety of nutritional compositions that are suitable for infants, senior citizens and other individuals with gastrointestinal issues.

The retentate product allows for the manufacture of cheese with higher calcium levels and cheese whey with significantly less whey protein as compared to fill concentration ultrafiltration cheese and is therefore more suitable for manufacture of semi-hard cheeses than ultrafiltration retentates. Whey proteins are typically lost in cheese whey in all ripened varieties of cheese; however, in certain heat-coagulated cheeses, the whey proteins are attached to caseins due to high temperature heat treatments.

In cheese manufactured from standard milk, the soluble proteins are lost in the whey and are denatured during cheese manufacture. When MF retentate milk is used for cheese manufacture, the soluble proteins of milk in native form are separated before cheese manufacture. The use of MF retentate helps the cheese manufacturers reduce whey protein disposal problems and also helps them to increase the capacity of their plant by increasing the per vat cheese yield.

The MF permeate is characterized by being sterile of microorganisms, having constant composition (does not vary with the variety of cheese being made from the retentate since the same retentate composition is suitable for making several varieties of cheeses), and contains commercially extractable amounts of highly functional (non-denatured, native-state, therefore retaining natural biochemical activity) whey (serum) proteins. It is similar to whey from conventional cheese making in lactose, total protein and ash content but unlike cheese whey normally does not contain measurable fat or casein and does not contain glycomacropeptides, rennet or starter culture. The lack of fat is positive especially for enhancement of the functional properties of whey protein concentrate or whey protein isolate obtained therefrom. The sterility and purity characteristics cause it to be free of typical "whey flavor" generally associated with whey obtained incident to commercial cheese production. It contains immunoglobulins, lactoferrins, lactoperoxidase, α-lactalbumin and β-lactoglobulin, all of which can be obtained therefrom.

The permeate is readily converted into nutritious soft drinks, both carbonated and non-carbonated, e.g., by formulating a composition containing by weight 6 to 10% permeate solids, 5 to 15% sugar, 1 to 2% gums/stabilizers and flavorants, colorants, and citric acid/ascorbic acid as needed. For beverage formulation, the permeate can be formulated with juices, such as orange, apple and grape juices. The permeate can be treated with enzymes to hydrolyze lactose to prevent complications associated with milk sugar consumption in lactose intolerant individuals. The permeate can be spray dried or freeze dried to provide a dry source of whey protein.

Whey (serum) proteins can be obtained from the permeate. For example, .beta.-lactoglobulin can be purified from the permeate by affinity adsorption utilizing chitosan (powdered sea shells) as the adsorption medium that preferentially binds β-lactoglobulin, and together with alternating acidic and basic conditions; β-lactoglobulin has been recovered in up to 85% purity in this way.

Uses for purified whey proteins include nutritional fluids for elderly or immuno-compromised individuals, infant formula (α-lactalbumin), molecular biology (cell growth factors), nutraceuticals, and highly-functional food ingredients (especially β-lactoglobulin).

The soluble milk protein (α-lactalbumin) and β-lactoglobulin can be separated from each other by heating the MF permeate at 50° C. followed by ultrafiltration. β-lactoglobulin will be retained on UF membranes while α-lactalbumin will pass in the permeate. Both proteins are recovered in their functional form and possess different health benefits.

An alternate embodiment is directed at a fruit beverage comprising by weight 10 to 30% fruit juice concentrate, 5 to 8% sugar and 62 to 85% of microfiltration permeate.

The fruit juice concentrate can be, for example, orange juice concentrate, gape juice concentrate, apple juice concentrate, grapefruit juice concentrate, tangerine juice concentrate, cranberry juice concentrate, mango juice concentrate, kiwi juice concentrate, pomegranate juice concentrate or other similar juice concentrates, and mixtures of these juice concentrates.

A fruit beverage based on orange juice concentrate comprises by weight 10 to 25% orange juice concentrate, 5 to 8% sugar and 67 to 85% of microfiltration permeate.

The invention herein is illustrated by the following working examples.

Example I

Microfiltration of Skim Milk to Provide a Retentate Concentrated to a Concentration Factor of 3-6 Fold and Permeate Skim milk was separated to manufacture micellar casein. Skim milk was subjected to a microfiltration (MF) process. In the MF process, the casein component of skim milk was concentrated 6-fold. Most of the lactose, minerals and serum (whey) proteins are found in the MF permeate. The MF retentate contained mostly caseins. The proportion of caseins to whey proteins in skim milk is 80:20, while by MF the proportion of caseins to whey proteins was changed to 90:10. The casein present in the MF retentate is micellar casein as the micellar integrity of caseins is not lost during MF process. Additionally, no acidification step is used or necessary for the isolation of micellar casein by processes of the invention. The caseins of MF retentate are in the same form as in raw milk. A table exemplifying the nutritional composition of micellar casein obtained by processes of the invention is set forth below.

| Product | Calcium mg/100 g | % Total minerals | % Casein | % Solids |
|---|---|---|---|---|
| Skim milk | 130-140 | 0.69-0.71 | 2.42-2.45 | 9.79-8.92 |
| Liquid micellar casein | 390-410 | 1.40-1.60 | 10-12 | 17-20 |

Example II

A nutritional composition is prepared from MF-retentate having either of the following compositions:
Fat=0.6-1%; Protein=10-11%; Lactose=0.5-1%; or
Fat=0.1-0.3%; Protein=4-8%; Lactose=0.1-0.5%

Example III

A nutritional beverage prepared from MF permeate has the following composition:
Fat=0%; Soluble protein or protein with the highest biological value=2-4%; and lactose=2-6%

What is claimed is:

1. A method for the production of a fraction containing micellar casein comprising the steps of:
   a. filtering high temperature, short time (HTST) pasteurized skim milk by a microfiltration process in a uniform transmembrane pressure loop system, in which the HTST pasteurized skim milk is heated to a temperature of 73° C. for at least 15 seconds or 72° C. for at least 16 seconds, and wherein the starting product has a pH of 6.5 to 6.8, wherein the temperature of the system is maintained within the range of from 5° C. to 15° C., and wherein the pH is maintained at the same pH as the starting product, and wherein casein in the HTST pasteurized skim milk is concentrated 6-fold during microfiltration; and
   b. separating the HTST pasteurized skim milk into a microfiltration permeate fraction comprising whey protein and a microfiltration retentate fraction comprising micellar casein, wherein the retentate fraction comprises a higher solids mass percentage of micellar casein and is depleted in whey protein as compared to the original skim milk,
wherein the method does not include an acidification step.

2. The method of claim 1, wherein the microfiltration process is carried out using a membrane having a pore size of 20,000-200,000 daltons and a uniform transmembrane pressure of 10-40 psi.

* * * * *